(12) United States Patent  (10) Patent No.: US 9,345,009 B2
Takeda et al.  (45) Date of Patent: May 17, 2016

(54) USER TERMINAL, RADIO COMMUNICATION METHOD AND RADIO COMMUNICATION SYSTEM

(71) Applicant: NTT DOCOMO, INC., Tokyo (JP)

(72) Inventors: Kazuaki Takeda, Tokyo (JP); Yang Lu, Beijing (CN); Liu Liu, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/420,667

(22) PCT Filed: Aug. 8, 2013

(86) PCT No.: PCT/JP2013/071497
§ 371 (c)(1),
(2) Date: Feb. 10, 2015

(87) PCT Pub. No.: WO2014/024964
PCT Pub. Date: Feb. 13, 2014

(65) Prior Publication Data
US 2015/0208403 A1    Jul. 23, 2015

(30) Foreign Application Priority Data

Aug. 10, 2012  (JP) ................................. 2012-178535

(51) Int. Cl.
*H04W 72/04* (2009.01)
*H04L 1/00* (2006.01)

(52) U.S. Cl.
CPC ............. *H04W 72/0413* (2013.01); *H04L 1/00* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 9,060,376 B2* | 6/2015 | Noh | ...................... | H04W 72/12 |
| 9,155,083 B2* | 10/2015 | Han | ...................... | H04L 1/1861 |
| 2012/0269180 A1* | 10/2012 | Li | .......................... | H04L 1/1822 |
| | | | | 370/336 |
| 2013/0208634 A1* | 8/2013 | Ji | ...................... | H04W 72/0406 |
| | | | | 370/280 |
| 2013/0301433 A1* | 11/2013 | Yin | ....................... | H04W 16/02 |
| | | | | 370/252 |

(Continued)

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

(Continued)

*Primary Examiner* — Benjamin H Elliott, IV
*Assistant Examiner* — Eric Nowlin
(74) *Attorney, Agent, or Firm* — Osha Liang LLP

(57) ABSTRACT

A user terminal carries out the steps of receiving downlink control information for a first cell and a second cell allocated to the PDCCH of the first cell, generating retransmission control signals for each downlink data signal in predetermined PUCCH formats, allocating the generated retransmission control signals to a PUCCH resource of the first cell, and sending feedback, and, when the ratio of DL subframes is higher in the second cell than in the first cell, applies PUCCH format 3 to a retransmission control signal for a downlink data signal of the second cell demodulated by using downlink control information in which the CCE number is equal to or lower than a predetermined value, and applies PUCCH format 1b to a retransmission control signal for a downlink data signal of the second cell demodulated by using downlink control information in which the CCE number is greater than the predetermined value.

10 Claims, 14 Drawing Sheets

(56) References Cited

U.S. PATENT DOCUMENTS

| | | | |
|---|---|---|---|
| 2015/0016311 A1* | 1/2015 | Han | H04W 24/10 370/280 |
| 2015/0117271 A1* | 4/2015 | Liang | H04L 1/1812 370/280 |
| 2015/0173065 A1* | 6/2015 | Fu | H04L 1/1861 370/280 |
| 2015/0200752 A1* | 7/2015 | Yin | H04L 1/1887 370/280 |
| 2015/0215079 A1* | 7/2015 | Park | H04L 1/1812 370/280 |
| 2015/0282204 A1* | 10/2015 | Zhao | H04W 72/1284 370/329 |

OTHER PUBLICATIONS

3GPP TS 36.213 V10.4.0; 3rd Generation Partnership Project; Technical Specification Group Radio Access Network; Evolved Universal Terrestrial Radio Access (E-UTRA); Physical layer procedures (Release 10); Dec. 2011 (125 pages).

International Search Report for corresponding International Application No. PCT/JP2013/071497, mailed Nov. 5, 2013 (1 page).

* cited by examiner

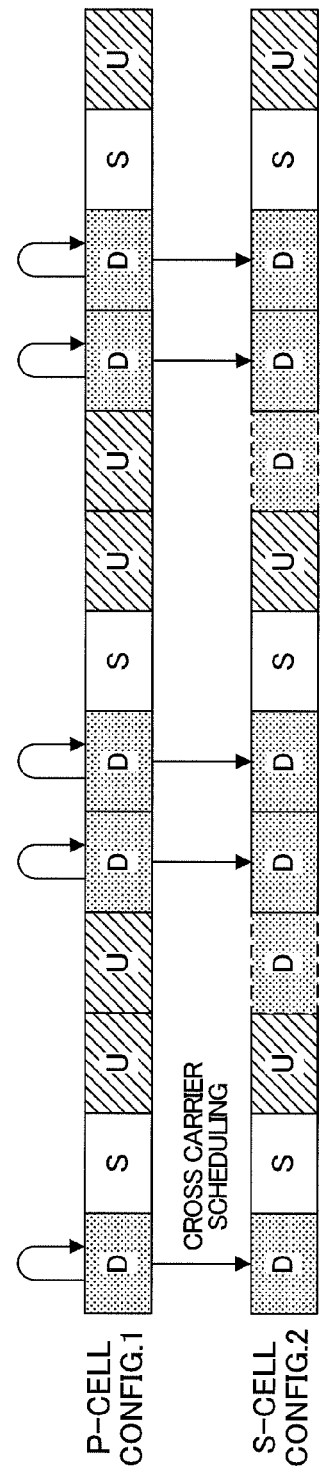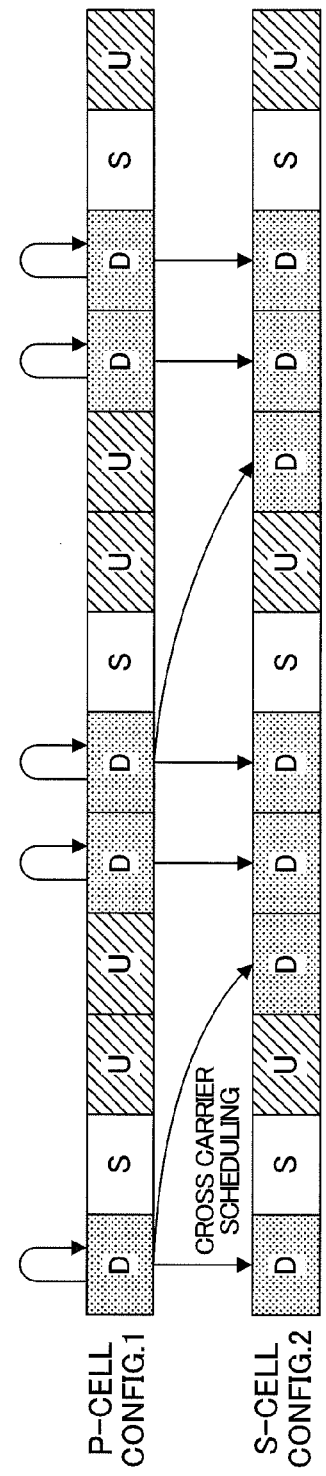
FIG.6A
FIG.6B

USER TERMINAL, RADIO COMMUNICATION METHOD AND RADIO COMMUNICATION SYSTEM

TECHNICAL FIELD

The present invention relates to a radio communication method, a radio communication system, and a user terminal that are applicable to cellular systems and so on.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, LTE (Long-Term Evolution) is under study for the purposes of further increasing high-speed data rates, providing low delay, and so on (non-patent literature 1).

In a third-generation system, it is possible to achieve a transmission rate of maximum approximately 2 Mbps on the downlink by using a fixed band of approximately 5 MHz. Meanwhile, in an LTE system, it is possible to achieve a transmission rate of about maximum 300 Mbps on the downlink and about 75 Mbps on the uplink by using a variable band which ranges from 1.4 MHz to 20 MHz. Furthermore, with the UMTS network, successor systems of LTE are also under study for the purpose of achieving further broadbandization and higher speed (for example, LTE-advanced ("LTE-A")). The system band of an LTE-A system includes at least one component carrier (CC), where the system band of the LTE system is one unit. Achieving broadbandization by gathering a plurality of components carriers (cells) in this way is referred to as "carrier aggregation" (CA).

In the uplink of the LTE-A system, application of SC-FDMA as a radio access scheme is under study. In order to maintain uplink single-carrier transmission characteristics even when a plurality of uplink frequency blocks are set, a study is in progress to transmit, selectively, retransmission control information (ACK/NACK and so on) for downlink data signals (PDSCH signals) transmitted individually from a plurality of downlink CCs, from a single CC (for example, from the primary cell (P-cell)). In this case, a user terminal needs to allocate PUCCH resources in order to feed back a plurality of retransmission control signals (retransmission control information) in response to the downlink data signals of each CC. In Rel. 10 LTE, a study is in progress to apply channel selection and/or the like for PUCCH resource allocation for retransmission control signals for two cells (two CCs) (non-patent literature 2).

Now, as uplink (UL) and downlink (DL) duplexing methods, there are frequency division duplexing (FDD), which divides between the uplink and the downlink based on frequency, and time division duplexing (TDD), which divides between the uplink and the downlink based on time. In Rel. 10 LTE, when carrier aggregation is executed in TDD, the ratio between uplink subframes and downlink subframes (TTIs: Transmission Time Intervals) is the same in all component carriers (see FIG. 1A). Meanwhile, in Rel. 11 LTE, a study is in progress in which, when carrier aggregation is executed in TDD, the ratio of uplink subframes and downlink subframes is changed per component carrier, taking into account application of a heterogeneous network and/or the like (see FIG. 1B).

Furthermore, a study is in progress, in which, as shown in FIG. 2, when carrier aggregation is employed, for example, downlink control information (DCI #2) for the downlink shared channel (PUSCH) that is transmitted in component carrier CC #2 (secondary cell (S-cell)) is multiplexed over the downlink control channel (PDCCH) in another component carrier CC #1 (P-cell)) and transmitted (cross-carrier scheduling). When this takes place, a DCI configuration, in which a carrier indicator (CI) is added in order to identify which component carrier's (between CC #1 and CC #2) downlink shared channel information the downlink control information (DCI #2) provides, is adopted.

CITATION LIST

Non-Patent Literature

Non-Patent Literature 1: 3GPP, TR25.912 (V7.1.0), "Feasibility Study for Evolved UTRA and UTRAN," September 2006

Non-Patent Literature 2: 3GPP, TR36.213 (V10.4.0), "Physical Layer Procedures," 2011-12

SUMMARY OF THE INVENTION

Technical Problem

In TDD carrier aggregation, when the ratio between uplink subframes and downlink subframes is changed in each CC, cases might occur where, as shown in FIG. 1B, the number of downlink subframes of S-cell becomes greater than the number of downlink subframes of P-cell. If cross-carrier scheduling is employed under this circumstance, given that there are relatively few P-cell downlink subframes, there may be subframes in S-cell that are not scheduled by the PDCCH (Physical Downlink Control Channel) of P-cell (for example, the fourth, fifth, ninth and tenth subframes of S-cell from the left in FIG. B).

On the other hand, by applying cross-carrier scheduling between different subframes (that is, by allocating downlink control information for S-cell to the PDCCH of P-cell in different subframes (cross-subframe scheduling)), it becomes possible to use all the downlink subframes of S-cell. If, in this case, retransmission control signals of P-cell and S-cell are fed back via predetermined uplink subframes of P-cell, cases might occur where the number of downlink subframes to send feedback varies between P-cell and S-cell. For example, the case may be expected where, in P-cell, retransmission control signals are fed back in response to three downlink subframes, whereas, in S-cell, retransmission control signals are fed back in response to four downlink subframes.

In this case, a user terminal needs to select resources so that the PUCCH resources to allocate when feeding back retransmission control signals for downlink data signals of P-cell and retransmission control signals for downlink data signals of S-cell in each downlink subframe do not overlap each other.

The present invention has been made in view of the above, and it is therefore an object of the present invention to provide a radio communication method, a radio communication system and a user terminal, whereby, even when the ratio between uplink subframes and downlink subframes is changed on a per CC basis while CA is executed in TDD, it is still possible to allocate PUCCH resources to feedback information effectively.

Solution to Problem

The radio communication method of the present invention provides a radio communication method for a radio base station and a user terminal that adopt carrier aggregation between a first cell and a second cell and that communicate by way of time division duplexing, and, in this radio communication method, the radio communication method carries out the steps in which the user terminal receives downlink control information for the first cell and the second cell respectively, allocated to a downlink control channel of the first cell, by adopting cross-carrier scheduling, determines retransmission control for downlink data signals transmitted through each cell, generates retransmission control signals for each downlink data signal in predetermined uplink control channel formats, and allocates the generated retransmission control signals to a resource of an uplink control channel of the first cell and sends feedback to the radio base station, and, when a ratio of downlink subframes is higher in the second cell than in the first cell, uplink control channel format 3 is applied to a retransmission control signal for a downlink data signal of the second cell demodulated by using downlink control information in which an index number of a channel control element is equal to or lower than a predetermined value, and uplink control channel format 1b is applied to a retransmission control signal for a downlink data signal of the second cell demodulated by using downlink control information in which an index number of a channel control element is greater than the predetermined value.

Technical Advantage of the Invention

According to the present invention, even when the ratio between uplink subframes and downlink subframes is changed on a per CC basis while CA is executed in TDD, it is still possible to allocate PUCCH resources to feedback information effectively.

BRIEF DESCRIPTION OF THE DRAWINGS

FIG. 6 provides diagrams to explain subframe configurations of each cell upon carrier aggregation in TDD, and cross-carrier scheduling;

DESCRIPTION OF EMBODIMENTS

First, a method of allocating PUCCH resources when, in TDD, retransmission control signals (ACK/NACK) in response to downlink data signals (PDSCH signals) of multiple subframes are fed back via the PUCCH in a predetermined uplink subframe will be described with reference to FIG. 3.

Figure 3A:
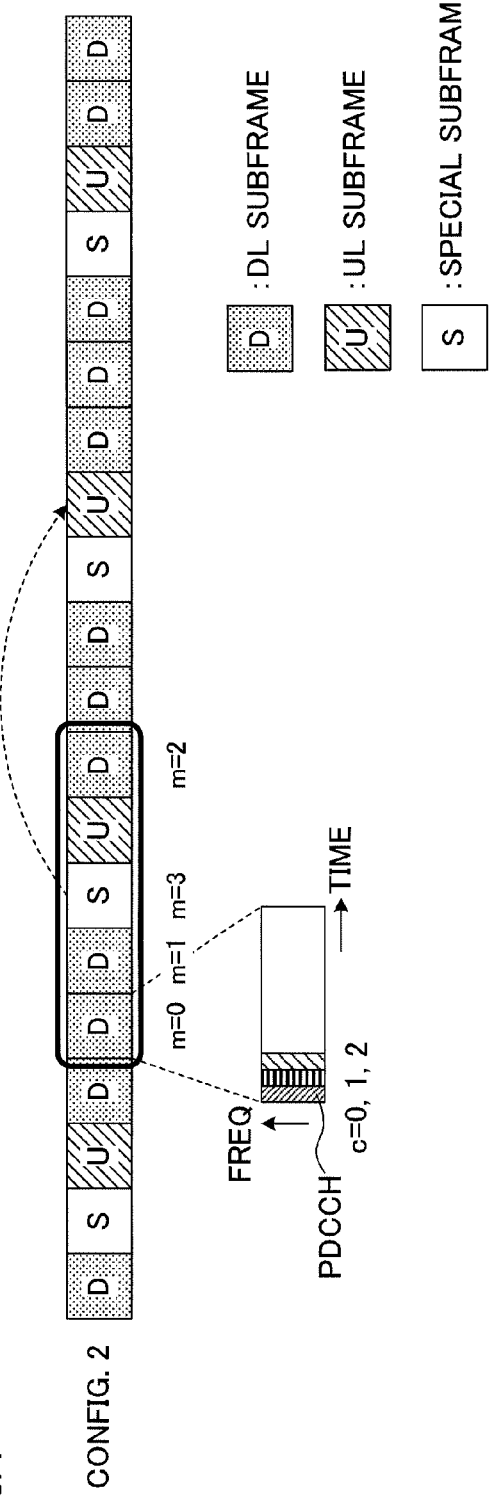
FIG. 3 provides diagrams to explain a method of allocating PUCCH resources when, in TDD, retransmission control signals that correspond to a plurality of subframes respectively are fed back.
Figure 3B:
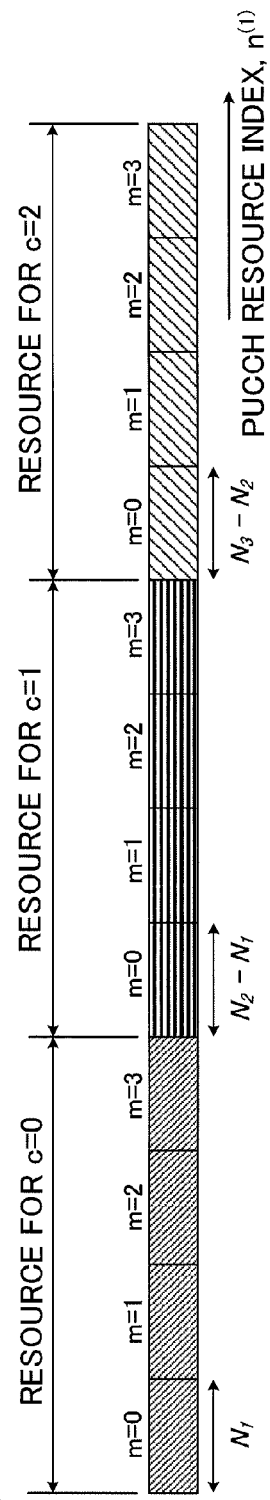

FIG. 3A shows a radio frame configuration (configuration with consecutive subframes) in TDD (here, configuration 2 (hereinafter referred to as "Config. 2")). Also, FIG. 3B shows a method of allocating PUCCH resources (method of numbering PUCCH resource indices) when retransmission control signals (retransmission control information) for downlink data signals in multiple subframes are fed back in a predetermined uplink subframe.

FIG. 3A shows a case where retransmission control signals in response to the downlink data signals of the fifth to ninth downlink subframes and special subframe from the left (hereinafter also referred to simply as "downlink subframes") are allocated to the PUCCH resource of the thirteenth uplink subframe from the left and fed back. Note that the special subframe that comes seventh from the left has a guard interval, which is necessary to switch between the uplink and the downlink, and the PDSCH, the PUSCH and so on are set via this guard interval.

As shown in FIG. 3A, in the event retransmission control signals of a plurality of subframes are fed back, candidates PUCCH resources to allocate to retransmission control signals for downlink data signals can be determined in accordance with following equation 1:

$$n^{(1)}_{PUCCH,m} = (M - m - 1) \times N_c + m \times N_{c+1} + n_{CCE,m} + \quad \text{(Equation 1)}$$
$$N^{(1)}_{PUCCH}, m = 0 \sim M - 1$$
$$= (N_{c+1} - N_c)m + (M - 1)N_c + n_{CCE,m} + N^{(1)}_{PUCCH}$$
$$N_c = \max\{0, \lfloor [N^{DL}_{RB} \times (N^{RB}_{SC} \times c - 4)]/36 \rfloor\}$$

where:

c: a value selected from $\{0, 1, 2, 3\}$ so that $c:N_c \leq n_{CCE,m} \leq N_{c+1}$ is met;

$N_{RB}^{DL}$: the number of resource blocks on the downlink;

$N_{SC}^{RB}$: the number of subcarriers per resource block along the frequency direction;

M: the number of subframes of which to feed back retransmission control signals;

m: a subframe number of a subframe of which to feed back a retransmission control signal;

$n_{CCE,m}$: the first CCE index number constituting downlink control information; and $N^{(1)}_{PUCCH}$: a parameters reported by higher layer signaling.

In FIG. 3, the number of subframes feeding back retransmission control signals via one UL subframe is four (M=4), so that the subframe numbers of these constituent subframes, m, are M=0, 1, 2 and 3. In FIG. 3A shows a case where the downlink subframes are prioritized over the special subframein the assignment of numbers m. To be more specific, the fifth subframe from the left is assigned m=0, the sixth subframe is assigned m=1, the seventh subframe is assigned m=3 and the ninth subframe is assigned m=2.

In FIG. 3A, the PUCCH resources to be allocated to retransmission control signals for the downlink data signals of the fifth, sixth, seventh and ninth subframes from the left are determined from above equation 1, based on m, which is the subframe number of a subframe of which to feed back a retransmission control signal, $n_{cce}$, which is the index number of the first CCE among the control channel elements (CCEs) that serve as downlink control information allocation units, c (Nc, which matches the number of CCEs included in up to c symbols), which corresponds to the number of PDCCH symbols, based on above equation 1, and so on. Note that the CCE index numbers to apply to each retransmission control signal match with the CCEs of downlink control information for demodulating the downlink data signals corresponding to the retransmission control signals.

In this way, when retransmission control signals of a plurality of DL subframes are fed back via the PUCCH in a predetermined UL subframe, the PUCCH resource for allocating each retransmission control signal is determined using above equation 1. By this means, it is possible to avoid allocating the same PUCCH resources between different retransmission control signals (a collision of PUCCH resources). Note that the PUCCH resource indices can be determined using OCC (Orthogonal Cover Code), CS (Cyclic Shift), and PRB (Physical Resource Block) indices.

Now, as noted earlier, in Rel. 10 and later versions, application of carrier aggregation is under study. Also, as a method of allocating retransmission control signals of multiple cells to PUCCH resources, a study is in progress to apply channel selection (PUCCH format 1b with channel selection) based on PUCCH format 1b, up to two CCs (two cells).

Figure 4:
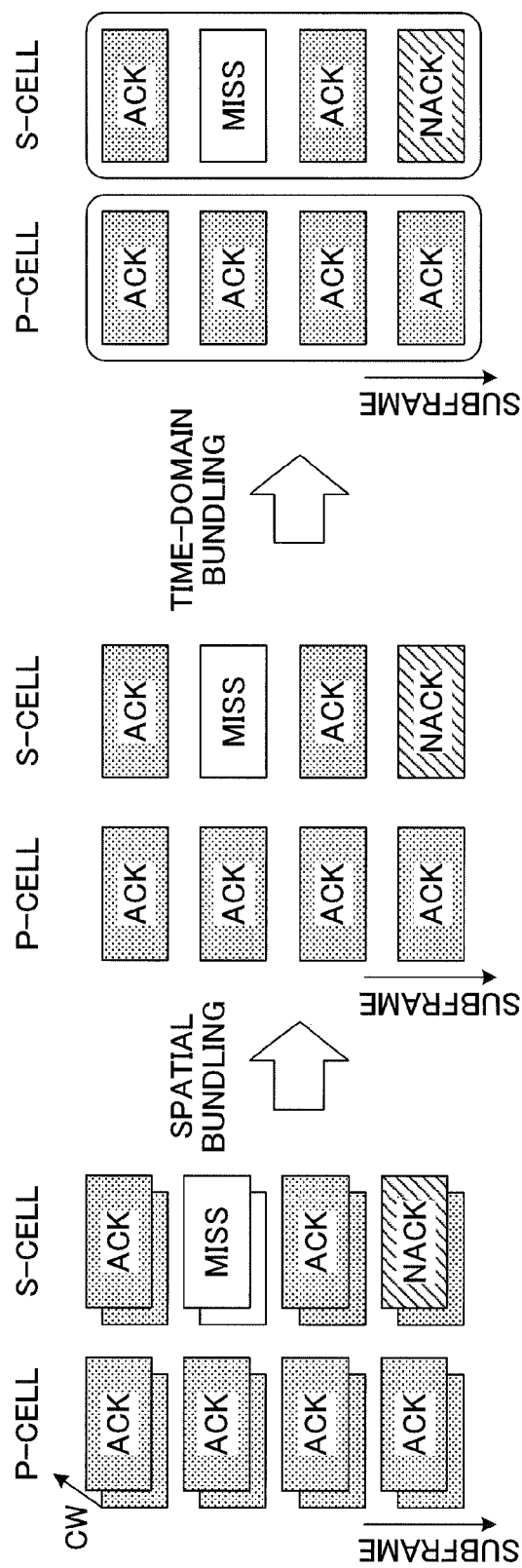
FIG. 4 is a diagram to explain the steps of allocating PUCCH resources to retransmission control signals (ACK/NACK) upon carrier aggregation in TDD.

FIG. 4 shows the steps of allocating retransmission control signals for downlink data signals of four subframes (M=4) to the PUCCH resource in a predetermined UL subframe when CA is employed in TDD (two cells (P-cell and S-cell)). When P-cell and S-cell both carry out two-codeword transmission, by means of spatial bundling, when P-cell and S-cell both transmit an ACK, an ACK is sent out, and, when one of P-cell and S-cell transmits a NACK or a MISS, a NACK or a MISS is sent out. Then, by time-domain bundling, each cell's retransmission control signal (ACK/NACK pattern) can be represented in two bits.

When channel selection based on PUCCH format 1b is applied (hereinafter also referred to as "PUCCH format 1"), a plurality of candidate PUCCH resources (for example, four of $n_{PUCCH,0}$ to $n_{PUCCH,3}$), to which retransmission control signals are allocated, can be determined based on equation 1 and so on, as noted earlier.

Also, when the same frame configuration is employed in P-cell and S-cell, cross-carrier scheduling is executed between P-cell and S-cell, so that even subframes that match each other have different CCE indices. Consequently, by controlling the allocation of PUCCH resources to retransmission control signals in each DL subframe based on the subframe number m, the CCE index number $n_{cce}$, c, which corresponds to the number of PDCCH symbols (above equation 1) and so on, it is possible to prevent collisions of PUCCH resources between P-cell and S-cell.

Also, when PUCCH format 1 is used, maximum thirty-six users can be multiplexed over an area of the same frequency/time by means of CSs (cyclic shifts) and OCCs (orthogonal cover codes), so that it is possible to improve the efficiency of use of resources.

Figure 5:
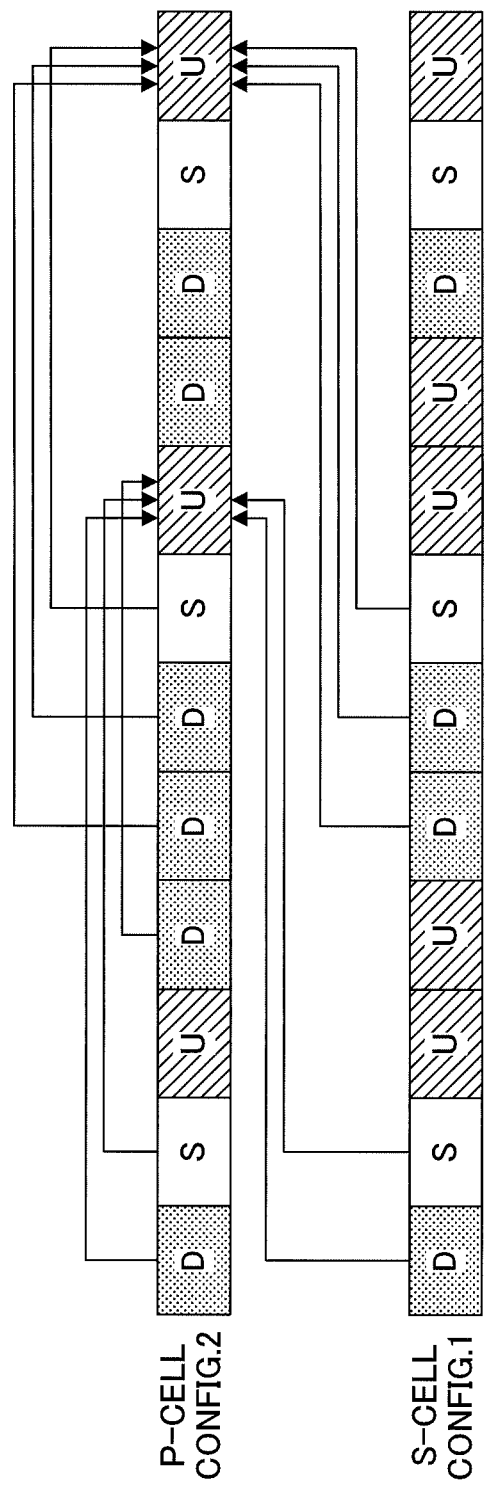
FIG. 5 is a diagram to explain examples of subframe configurations of each cell upon carrier aggregation in TDD.

Meanwhile, as noted earlier, in Rel. 11 and later versions, a study is in progress to change the ratio of UL subframes and DL subframes in each component carrier. For example, when, as shown in FIG. 5, P-cell adopts Config. 2 of TDD and S-cell adopts Config. 1 of TDD, retransmission control signals in each S-cell subframe are fed back using the PUCCH resource of a predetermined UL subframe of P-cell.

Figures 1A, 1B:
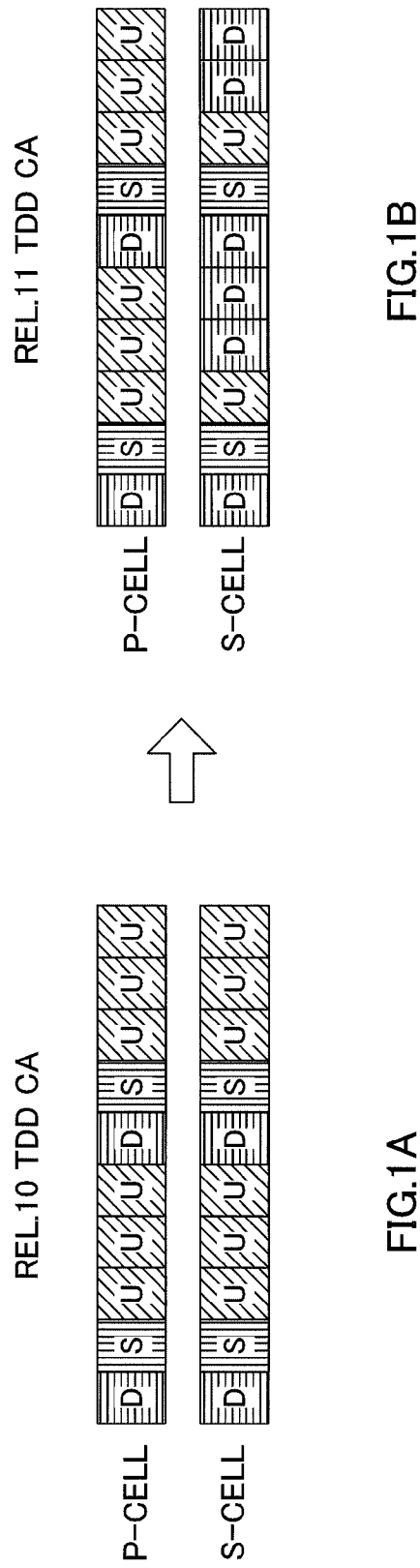
FIG. 1 provides diagrams to explain carrier aggregation in TDD and subframe configurations in each cell.
Figure 2:
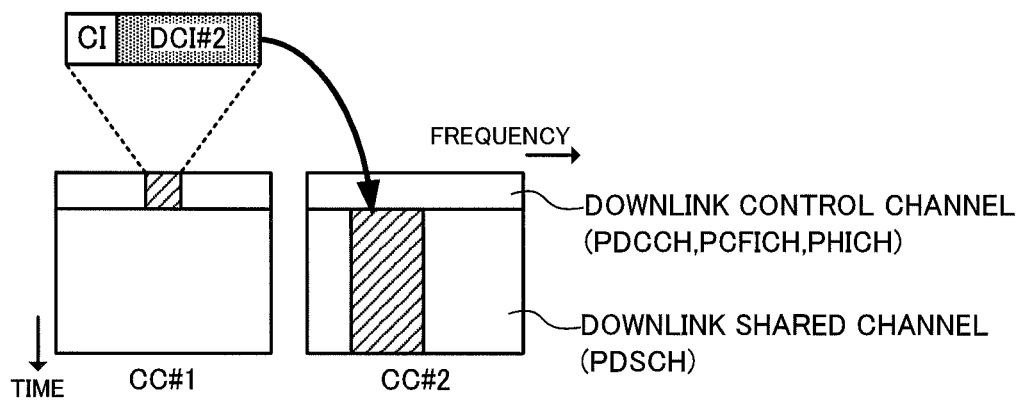
FIG. 2 is a diagram to explain cross-carrier scheduling.

When this takes places, as has been shown earlier with FIG. 2, it is possible to multiplex and transmit downlink control information for demodulating the downlink data signals transmitted in S-cell, upon the PDCCH of P-cell (cross-carrier scheduling). In the event of FIG. 5, downlink control information for demodulating the downlink data signals allocated to the first, second, fifth, sixth, seventh, tenth and eleventh subframes of S-cell from the left is allocated to the PDCCH in P-cell subframes that match in the time axis direction.

Also, as shown in FIG. 6, when P-cell adopts Config. 1 of TDD and S-cell adopts Config. 2 of TDD, in one frame, the number of downlink subframes in S-cell becomes greater than the number of downlink subframes in P-cell. Consequently, if cross-carrier scheduling is applied between P-cell and S-cell only in subframes that match each other along the time axis direction (the horizontal direction in FIG. 6), there may be downlink subframes that cannot be scheduled, in S-cell (see FIG. 6A). In FIG. 6A, the fourth and ninth S-cell downlink subframes from the left cannot be used.

Meanwhile, it may be possible to allocate downlink control information for S-cell to the PDCCH of an unmatching P-cell downlink subframe along the time axis direction and execute cross-carrier scheduling (cross-subframe scheduling) (see FIG. 6B). In FIG. 6B, downlink control information for demodulating the downlink data signals allocated to the fourth and ninth S-cell subframes from the left is allocated to the PDCCH of the first and sixth P-cell downlink subframes from the left, respectively. This makes it possible to use downlink subframes that are present only in S-cell (downlink subframes where the corresponding P-cell subframes are uplink subframes), and improve throughput.

However, the present inventors have found out that, as shown in FIG. 6B, when the number of DL subframes M of which to feed back retransmission control signals in a predetermined UL subframe is different between P-cell and S-cell (especially when it is greater in S-cell than in P-cell), there is a concern that collisions might occur in the allocation of retransmission control signals to PUCCH resources.

Figure 7:
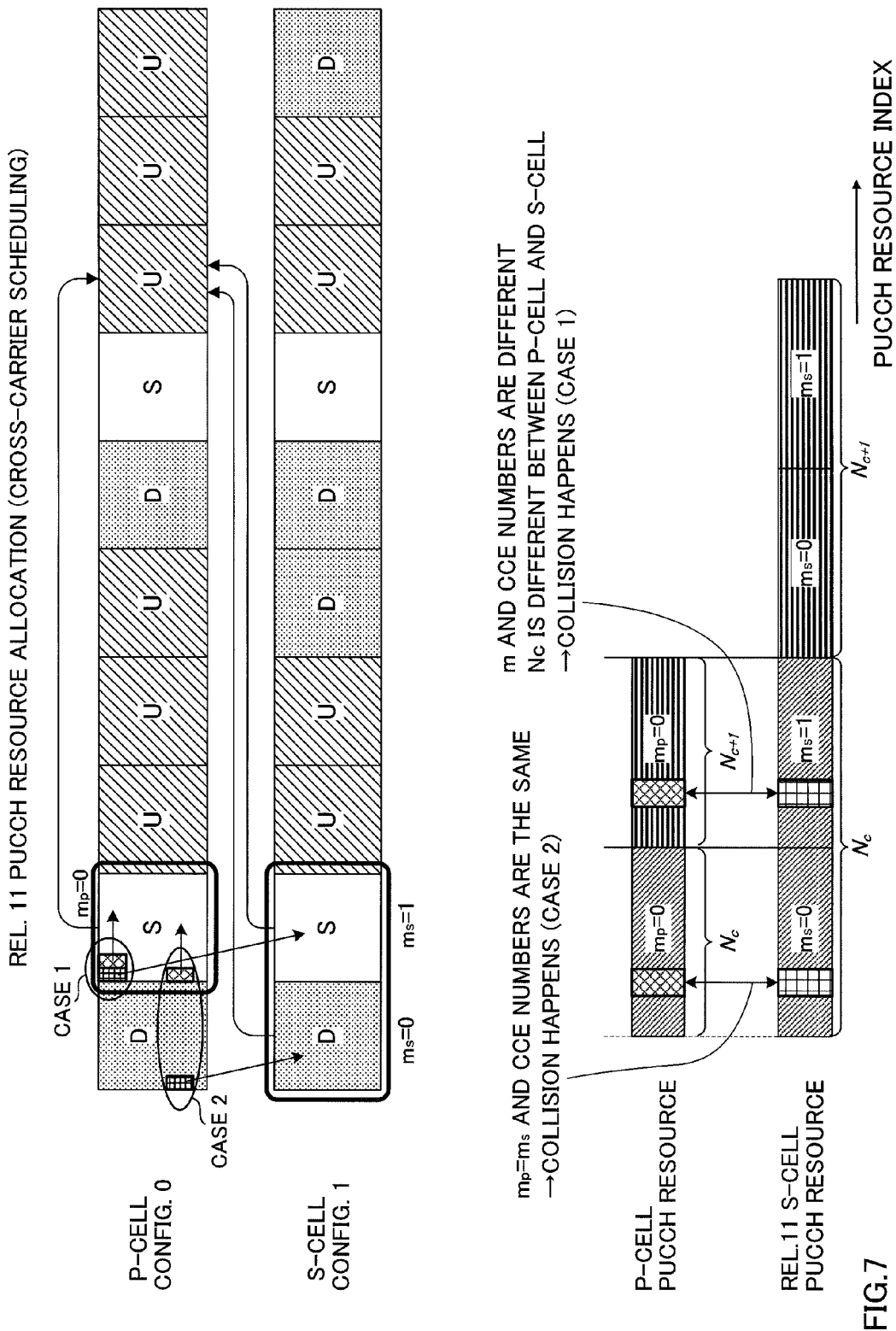
FIG. 7 provides diagrams to explain cases where the PUCCH resources allocated to each retransmission control signal overlap, when, in TDD, retransmission control signals of each subframe are fed back via an uplink control channel.

FIG. 7 illustrates a radio frame configuration where P-cell employs Config. 0 of TDD and S-cell employs Config. 1 of TDD (FIG. 7A), and a schematic diagram of a case where retransmission control signals for downlink data signals in multiple subframes are allocated to the PUCCH resource in a predetermined uplink subframe of P-cell (FIG. 7B). Note that FIG. 7B shows a schematic diagram of a case where the PUCCH resources to allocate to each retransmission control signal are determined using above equation 1.

To be more specific, FIG. 7 shows a case where retransmission control signal for the downlink data signal of the second P-cell subframe from the left is allocated to the PUCCH resource of the eighth P-cell uplink subframe from the left and fed back. Also, a case is also shown here where retransmission control signals for the downlink data signals of the first and second S-cell subframes from the left are allocated to the PUCCH resource of the eighth P-cell uplink subframe from the left and fed back. That is, the time the retransmission control signals of S-cell are fed back matches the time of an uplink subframe in that S-cell.

Consequently, the number of subframes of which to feed back retransmission control signals in P-cell is one (M=1), and the number of subframes of which to feed back retransmission control signals in S-cell is two (M=2). In this case, the second subframe from the left in P-cell is $m_p=0$, while, in S-cell, the first subframe from the left is $m_s=0$ and the second subframe is $m_s=1$.

Also, in FIG. 7, cross-carrier scheduling is applied, and downlink control information for the first S-cell subframe from the left is allocated to the PDCCH of the first P-cell subframe from the left. Also, downlink control information for the second S-cell subframe from the left is allocated to the PDCCH of the second P-cell subframe from the left.

In this case, if the PUCCH resources to allocate to the retransmission control signals for the downlink data signals of each subframe are determined by applying above equation 1, there is a threat that the PUCCH resource where the retransmission control signal of P-cell is allocated and the PUCCH resource where the retransmission control signals of S-cell are allocated might overlap (that is, the PUCCH resources collide). This is because the number of subframes M that send feedback is different between P-cell and S-cell and therefore Nc differs between P-cell and S-cell (case 1), and because the same CCE number is assigned to the downlink control information allocated to P-cell and S-cell subframes having the same subframe number m (case 2).

That is, in case 1, the CCE number and Nc varies with each downlink control information of P-cell and S-cell allocated to the PDCCH, the subframe number ($m_p$) of P-cell and the subframe number ($m_s$) of S-cell to be set in the subframes (the second subframes from the left) that match each other in the time axis direction are different. Following this, cases might occur where the PUCCH resources to allocate the retransmission control signal for P-cell to, and the PUCCH resource to allocate the retransmission control signals for S-cell to, collide (see FIG. 7B).

Also, in case 2, the P-cell subframe number ($m_p$) and the S-cell subframe number ($m_s$) assigned to subframes that do not match each other in the time axis direction become the same, and furthermore, different CCE numbers are assigned to both. Following this, cases might occur where the PUCCH resources to allocate the retransmission control signal for P-cell to, and the PUCCH resource to allocate the retransmission control signals for S-cell to, collide (see FIG. 7B).

Figure 8A:
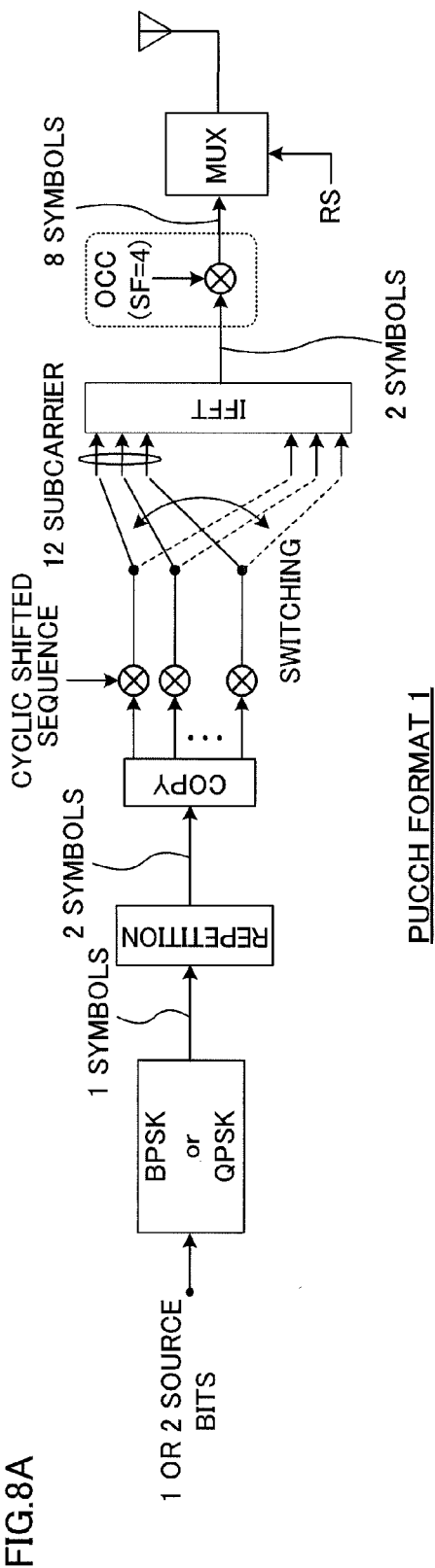
FIG. 8 provides diagrams to explain PUCCH formats.
Figure 8B:
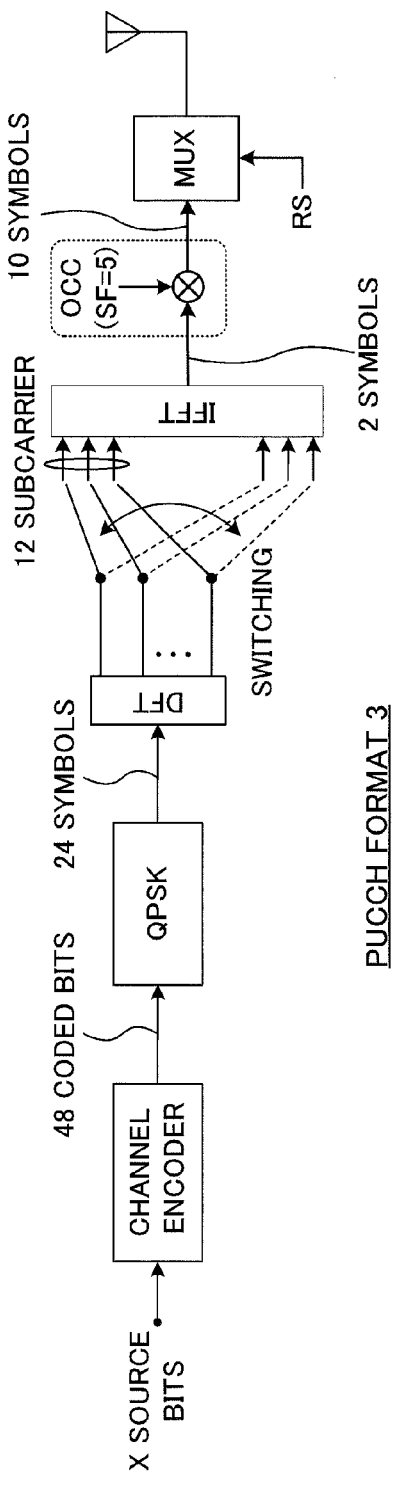

So, in order to prevent the PUCCH resources of retransmission control signals of multiple cells from colliding with each other, it may be possible to apply PUCCH format 3 (see FIG. 8B), which has greater capacity than PUCCH format 1 (see FIG. 8A), to retransmission control signals (ACK/NACK) of multiple subframes of each cell.

PUCCH format 3 is a PUCCH format that is newly defined in LTE-A, and is capable of transmitting a large number of ACK/NACK bits. In PUCCH format 3, similar to the PDSCH, signals are generated by DFT (Discrete Fourier Transform)-based precoding, and varying UEs can be multiplexed by means of orthogonal codes (OCCs: Orthogonal Cover Codes) (see FIG. 8B). To be more specific, ACKs/NACKs of multiple cells are subjected to channel coding, and output so that the number of bits per subframe is forty-eight. The forty-eight-bit sequence that is output is made twenty-four symbols through phase shift keying modulation (QPSK), and then subjected to a DFT process.

When PUCCH format 1b-based channel selection (hereinafter referred to as "PUCCH format 1") is applied, as noted earlier, there is a concern that the PUCCH resources allocated to retransmission control signals of P-cell and S-cell may collide. Meanwhile, when PUCCH format 3 is applied, one PUCCH resource that is designated by downlink control information is selected from among a plurality of PUCCH resource allocation candidates (for example, four PUCCH resources) that are reported by higher layer signaling (see FIG. 9). Then, a user terminal allocates a plurality of retransmission control signals to the PUCCH resource designated by the radio base station, so that it is possible to prevent the PUCCH resources to be allocated to retransmission control signals of P-cell and S-cell from colliding with each other.

Figure 9:
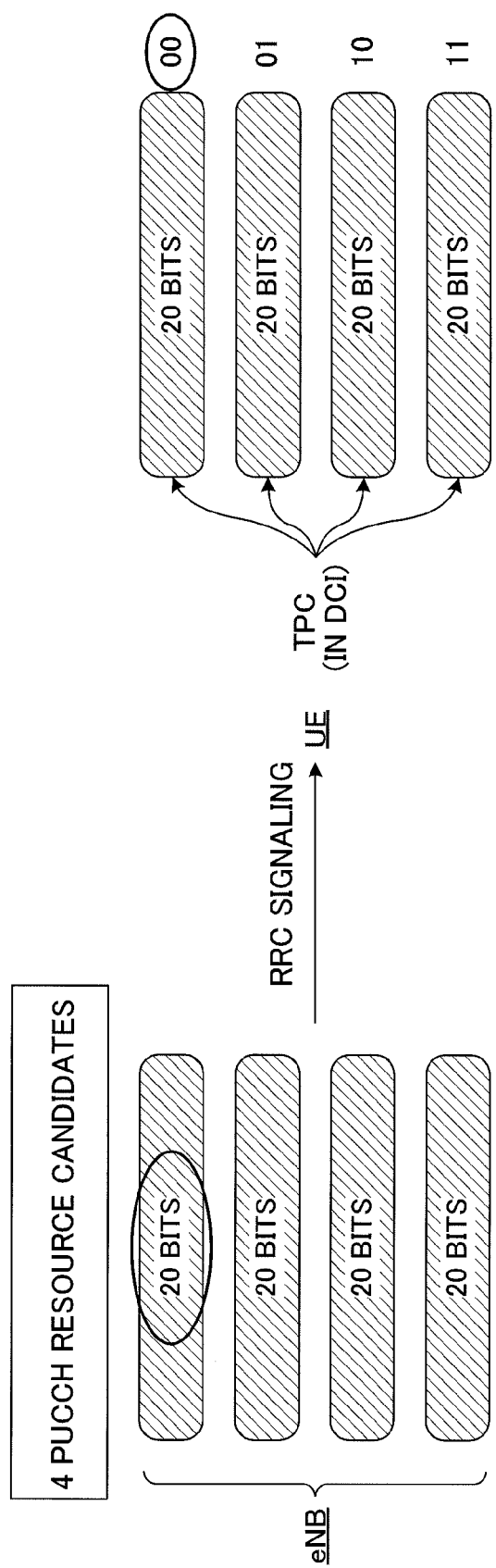
FIG. 9 is a diagram to explain a method of selecting PUCCH resources when PUCCH format 3 is applied.

Note that, when PUCCH format 3 is applied, an indicator (ARI: A/N Resource Indicator) to indicate a specific PUCCH resource can be included and reported in a TPC command in downlink control information of S-cell. FIG. 9 shows a case where an ARI that is constituted of two bits indicates "00," and a case where a user terminal allocates a plurality of retransmission control signals to the PUCCH resource designated by "00."

In this way, when, during CA in TDD, the ratio of downlink subframes is higher in a second cell than in a first cell, it is possible to prevent the PUCCH resources to allocate to retransmission control signals from colliding with each other by applying PUCCH format 3. Meanwhile, when PUCCH format 3 is applied, compared to the case where PUCCH format 1 is applied, the efficiency of use of radio resources lowers, and the number of bits of retransmission control signals to feed back increases.

For example, when PUCCH format 1 is applied, it is possible to multiplex maximum thirty-six users in one PRB of the same frequency/time by means of CSs (Cyclic Shifts) and OCCs (Orthogonal Cover Codes). Meanwhile, when PUCCH format 3 is applied, only maximum five users can be multiplexed in one PRB. Also, although the number of bits to feed back is two when PUCCH format 1 is applied, the number of bits to feed back increases to twenty when PUCCH format 3 is applied.

So, the present inventors have conceived, when determining the PUCCH resources, to which retransmission control signals are allocated, based on CCE indices and so on as shown in above equation 1, while CA is carried out in TDD, of applying PUCCH format 3 to retransmission control signals of S-cell that have a possibility of colliding with PUCCH resources where retransmission control signals of P-cell are allocated, and applying PUCCH format 1 to retransmission control signals of S-cell that have no possibility of collisions. The present inventors have found out that, by this means, it is possible to reduce the collisions of PUCCH resources allocated to each retransmission control signal of P-cell and S-cell, improve the efficiency of use of radio resources, and reduce the number of bits of retransmission control signals to feed back.

For example, referring to above FIG. 7B, assume that the PUCCH resources to allocate to each retransmission control signal are determined by applying above equation 1. In this case, among the PUCCH resources to be allocated to the retransmission control signal of P-cell and the PUCCH resources to be allocated to the retransmission control signals of S-cell, PUCCH format 3 is applied to the retransmission control signals of the area where the PUCCH resource indices overlap. Meanwhile, PUCCH format 1 is applied to the retransmission control signals of the area where the PUCCH resource indices do not overlap.

To be more specific, in FIG. 7B, the retransmission control signals for downlink data signals demodulated by using S-cell downlink control information in which the CCE index is greater than a predetermined value ($N_c$) are applied PUCCH format 1 and fed back. Also, the retransmission control signals for downlink data signals demodulated by using S-cell downlink control information in which the CCE index is equal to or lower than the predetermined value ($N_c$) are applied PUCCH format 3 and fed back. Now, the details will be described below with reference to FIG. 10.

Figure 10A:
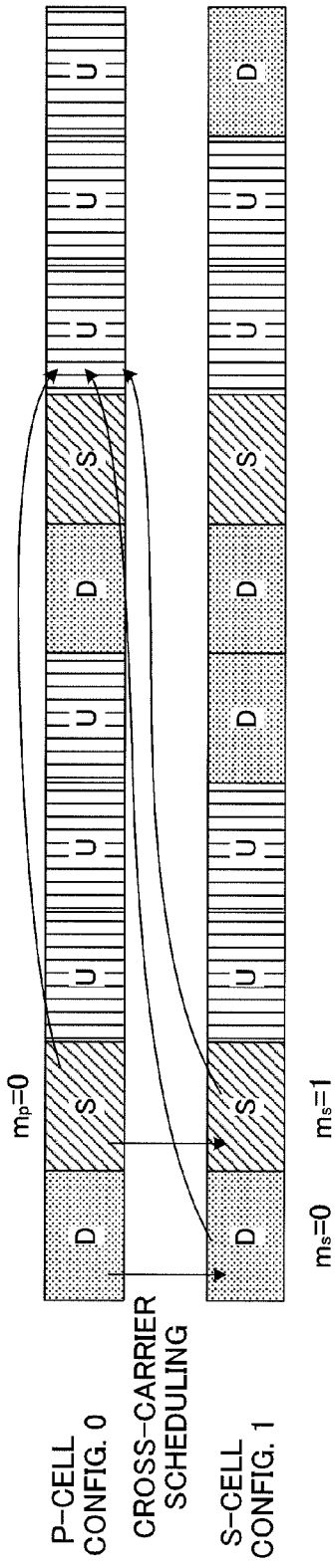
FIG. 10 provides diagrams to explain an example of a PUCCH resource allocation method according to the present embodiment.
Figure 10B:
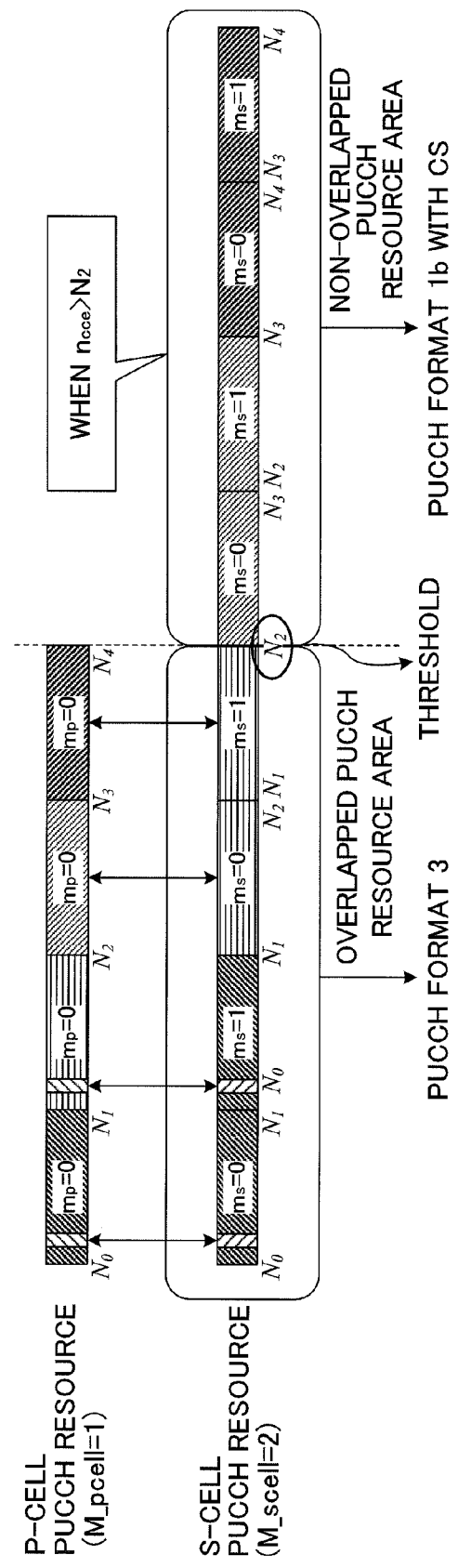

FIG. 10 shows radio frame configurations where P-cell adopts TDD Config. 0 and S-cell adopts TDD Config. 1 (FIG. 10A), and a case where retransmission control signals for downlink data signals in multiple subframes are allocated to the PUCCH resource of a predetermined uplink subframe of P-cell (FIG. 10B).

Also, in FIG. 10, a case is shown where the number of DL subframes to feed back from P-cell is one ($M_{pcell}=1$) and the number of DL subframes to feed back from S-cell is two ($M_{pcell}=2$). To be more specific, as shown in FIG. 10A, a retransmission control signal for the downlink data signal in the second P-cell subframe from the left and retransmission control signals for the downlink data signals in the first and second S-cell subframes from the left are allocated to the PUCCH resource of the eighth P-cell uplink subframe from the left and fed back.

In this case, if candidate PUCCH resources to allocate the retransmission control signals to are determined using above equation 1 and so on as defined in Rel. 10, there is a threat that the indices of the PUCCH resources where the retransmission control signals are allocated overlap between P-cell and S-cell, as shown in FIG. 10B. Consequently, among the retransmission control signals of S-cell, PUCCH format 3 is applied to the retransmission control signal having a possibility of a PUCCH resource collision with the P-cell retransmission control signal, and PUCCH format 1 is applied to the retransmission control signals having no possibility of collisions.

To be more specific, retransmission control signals for downlink data signals of S-cell that are received by using downlink control information in which the CCE index number $n_{cce}$ is greater than a predetermined value (threshold) (here, $n_{cce}>N_2$) are applied PUCCH format 1 and fed back. That is, it is possible to apply PUCCH format 1b-based channel selection, and determine a plurality of candidate PUCCH resources to use in channel selection by using above equation 1. Also, S-cell retransmission control signals ($n_{cce} \leq N_2$) with a concern of colliding with PUCCH resources allocated to P-cell retransmission control signals are applied PUCCH format 3 and fed back.

By this means, it is possible to effectively prevent the PUCCH resources allocated to retransmission control signals that are fed back from P-cell and S-cell from colliding with each other. Also, instead of applying PUCCH format 3 to all retransmission control signals of S-cell, PUCCH format 1 is applied to retransmission control signals in which the PUCCH resource allocation does not collide with P-cell retransmission control signals, so that it is possible to improve the efficiency of use of radio resource and reduce the number of bits required to feed back the retransmission control signals.

Note that PUCCH format 3 may be set as the default PUCCH format to apply to the feedback of S-cell retransmission control signals. In this case, if the PUCCH resources allocated to P-cell and S-cell retransmission control signals do not collide with each other, a fallback to PUCCH format 1 is made with respect to the S-cell retransmission control signal.

Figure 11:
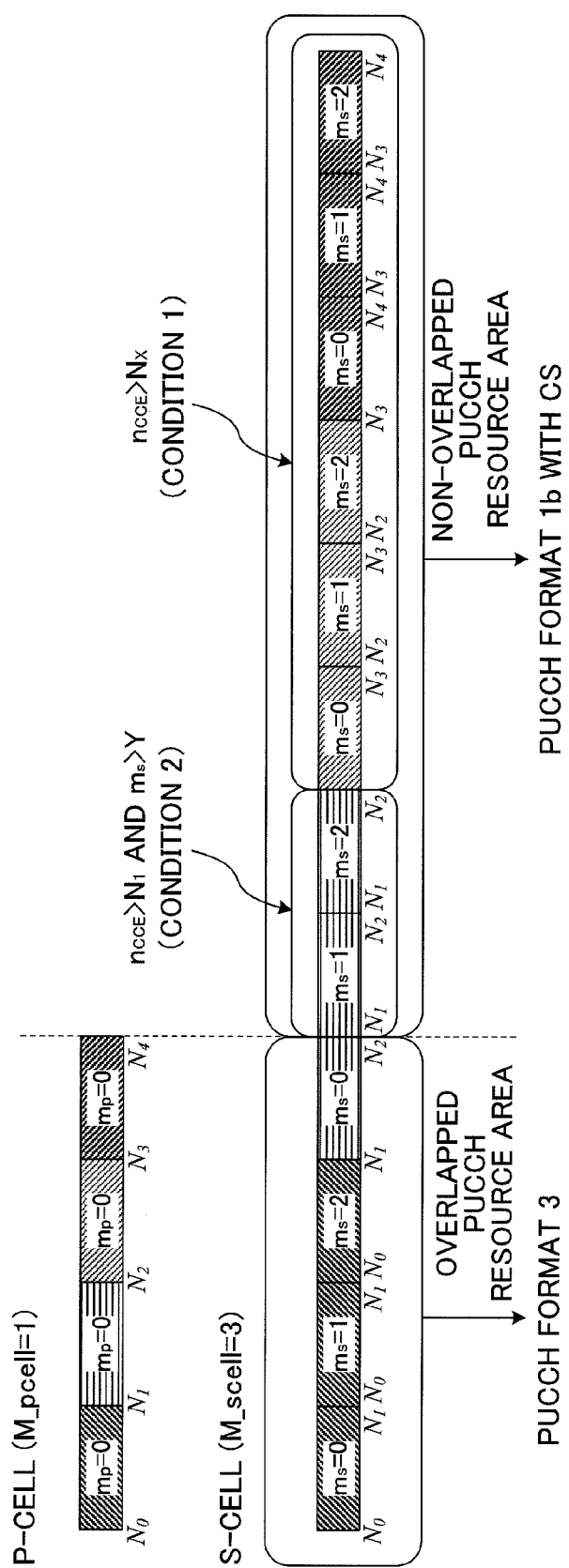
FIG. 11 is a diagram to explain another example of a PUCCH resource allocation method according to the present embodiment.

FIG. 11 illustrates a case where the number of DL subframes to feed back from P-cell is one ($M_{pcell}=1$) and the number of DL subframes to feed back from S-cell is three ($M_{pcell}=3$).

In this case, too, if PUCCH resource allocation candidates for the retransmission control signals are determined using above equation 1 and so on as defined in above Rel. 10, the indices of the PUCCH resources where the retransmission control signals are allocated overlap between P-cell and S-cell, as in FIG. 10B.

Consequently, among the retransmission control signals of S-cell, PUCCH format 3 is applied to the retransmission control signal which has a possibility of a PUCCH resource collision with the retransmission control signal of P-cell, and PUCCH format 1 is applied to the retransmission control signals having no possibility of collisions.

To be more specific, PUCCH format 1 is applied to retransmission control signals for S-cell downlink data signals that are received by using downlink control information in which the CCE index number $n_{cce}$ is greater than a predetermined value (threshold).

Whether or not the CCE index number $n_{cce}$ is greater than a predetermined value (threshold) may be determined based on the following conditions:

[2]

$$n_{cce}>N_X \qquad \text{Condition 1:}$$

$$n_{cce}>N_1 \text{ and } m_s>Y \qquad \text{Condition 2:}$$

where:
$N_X = \max\{0, \lfloor [N_{RB}^{DL} \times (N_{SC}^{RB} \times X - 4]/36 \rfloor\}$;
$X = \lceil 4M_{PCell}/M_{SCell} \rceil$;
$Y = 4M_{PCell} - (X-1)M_{SCell} - 1$;
$M_{PCell}$: the number of DL subframes in P-cell;
$M_{SCell}$: the number of DL subframes in S-cell; and
$m_s$: a subframe number of a subframe of second-cell of which to feed back a retransmission control signal.

A user terminal applies PUCCH format 1 to retransmission control signals for S-cell downlink data signals that are demodulated by using downlink control information in which the CCE index number meets one of the above condition 1 and condition 2.

In the case illustrated in FIG. 11, $M_{PCell}=1$ and $M_{SCell}=3$ hold, so that X=ceil (4/3)=2 and Y=0 hold. Consequently, PUCCH format 1 is applied (fallback) to the retransmission control signals to meet $n_{cce}>N_2$ (condition 1) and the retransmission control signals to meet $n_{cce}>N_1$ and $m_s>0$ (condition 2). As shown in FIG. 11, the retransmission control signals, in which the CCE index number $n_{cce}$ fulfils at least condition 1 or condition 2, are placed in the area where the indices of the PUCCH resources allocated to the retransmission control signal of P-cell and S-cell do not overlap (non-overlapped PUCCH resource area). On the other hand, in the event retransmission control signals meet neither condition 1 nor condition 2, the retransmission control signals are placed in the area where the indices of the PUCCH resources allocated to the retransmission control signals of P-cell and S-cell overlap (overlapped PUCCH resource area).

Note that, in the case shown in above FIG. 10, $M_{PCell}=1$ and $M_{SCell}=2$ hold, so that X=2 and Y=1 hold. Consequently, PUCCH format 1 is applied (fallback) to the retransmission control signals to meet $n_{cce}>N_2$ (condition 1) and the retransmission control signals to meet $n_{cce}>N_1$ and $m_s>1$ (condition 2).

In this way, even when the ratio of downlink subframes is higher in a second cell than in a first cell, among the PUCCH resources allocated to retransmission control signals of P-cell and the PUCCH resources allocated to retransmission control signals of S-cell, it is possible to apply PUCCH format 3 to parts where the PUCCH resource indices overlap, and apply PUCCH format 1 to parts where the PUCCH resource indices do not overlap. By this means, it is possible to effectively prevent the PUCCH resources of each retransmission control signal from colliding with each other, and, furthermore, improve the efficiency of use of radio resources and reduce the number of bits required to feed back the retransmission control signals.

(Radio Communication System)

Figure 12:
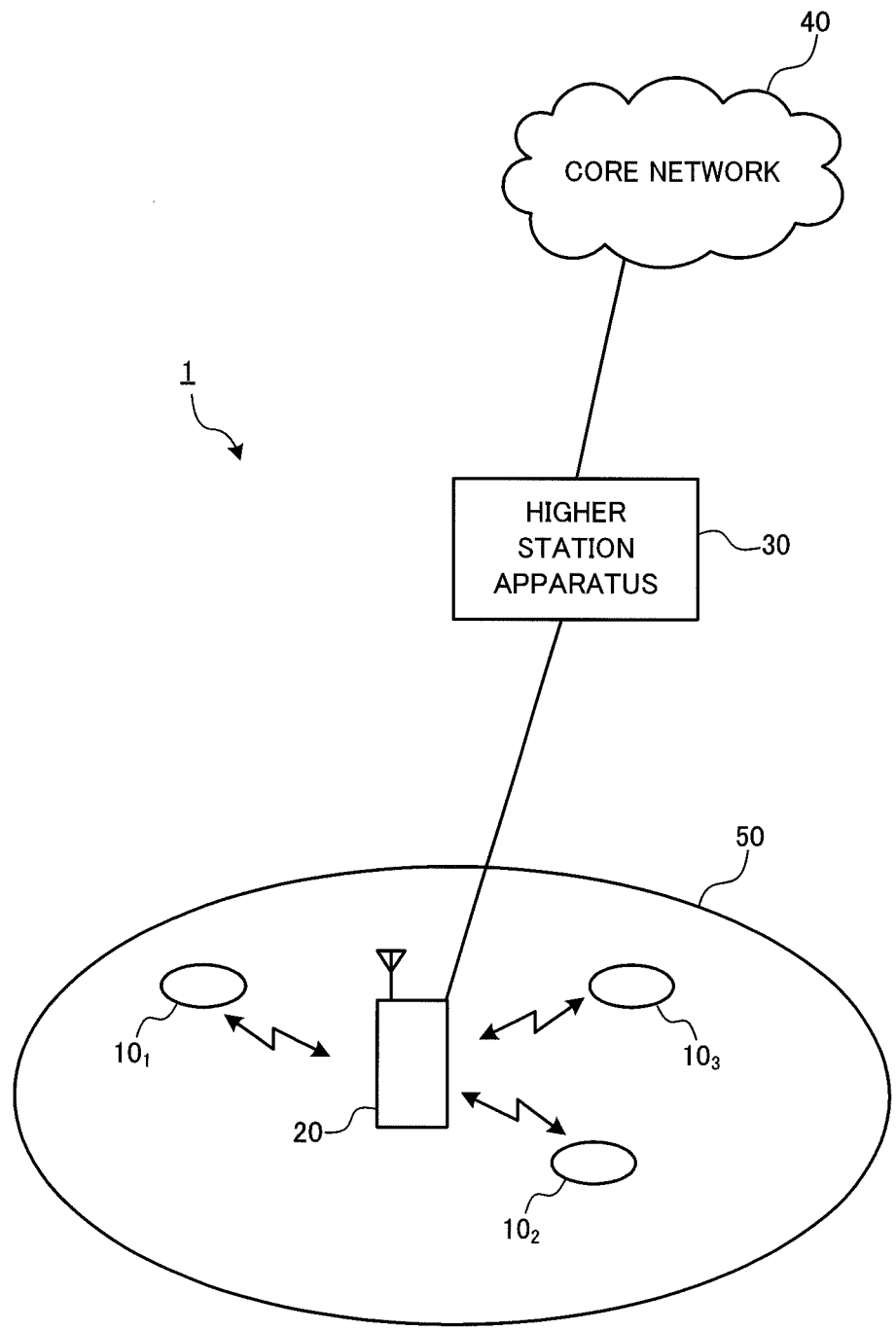
FIG. 12 is a diagram to explain a system configuration of a radio communication system.

Now, a radio communication system according to the present embodiment will be described below in detail. FIG. 12 is a diagram to explain a system configuration of the radio communication system according to the present embodiment. Note that the radio communication system shown in FIG. 12 is a system to accommodate, for example, the LTE system or SUPER 3G. In this radio communication system, carrier aggregation, which groups a plurality of fundamental frequency blocks into one by using the system band of the LTE system as one unit, is used. Also, this radio communication system may be referred to as "IMT-advanced" or may be referred to as "4G."

As shown in FIG. 12, a radio communication system 1 is configured to include a radio base station 20, and a plurality of user terminals $10_1$, $10_2$ and $10_3$ that communicate with this radio base station 20. This radio communication system 1 allows radio communication between the radio base station and the user terminals by way of time division duplexing, and achieves broadbandization by carrier aggregation.

The radio base station 20 is connected with a higher station apparatus 30, and this higher station apparatus 30 is connected with a core network 40. Also, radio base stations 20 may be connected with each other by wire connection or by wireless connection. The user terminals $10_1$, $10_2$ and $10_3$ can communicate with the radio base station 20 in a cell 50. Note that the higher station apparatus 30 may be, for example, an access gateway apparatus, a radio network controller (RNC), a mobility management entity (MME) and so on, but is by no means limited to these.

The user terminals $10_1$, $10_2$ and $10_3$ include LTE terminals and LTE-A terminals. Also, although the user terminals $10_1$, $10_2$ and $10_3$ will be described to perform radio communication with the radio base station 20 for ease of explanation, more generally, user equipment (UE), which may include both user terminals and fixed terminal apparatuses, may be used as well.

In the radio communication system 1, as radio access schemes, OFDMA (Orthogonal Frequency Division Multiple Access) is applied to the downlink and SC-FDMA (Single-Carrier-Frequency-Division Multiple Access) is applied to the uplink, but the uplink radio access scheme is not limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Downlink communication channels include a PDSCH, which is used by the user terminals $10_1$, $10_2$, and $10_3$ on a shared basis as a downlink data channel, and downlink L1/L2 control channels (PDCCH, PCFICH, and PHICH). Transmission data and higher control information are transmitted by the PDSCH. PDSCH and PUSCH scheduling information and so on are transmitted by the PDCCH. The number of OFDM symbols to use for the PDCCH is transmitted by the PCFICH (Physical Control Format Indicator Channel). HARQ ACK/NACK in response to the PUSCH are transmitted by the PHICH (Physical Hybrid-ARQ Indicator CHannel).

Uplink communication channels include a PUSCH (Physical Uplink Shared Channel), which is used by each user terminal on a shared basis as an uplink data channel, and a PUCCH (Physical Uplink Control Channel), which is an uplink control channel. By means of this PUSCH, transmission data and higher control information are transmitted. Furthermore, the PUCCH transmits downlink received quality information (CQI), ACK/NACK, and so on.

Next, the configuration of a user terminal that feeds back retransmission control signals will be described with reference to FIG. 13.

A case will be presented with the following description where, when CA is carried out in TDD, retransmission control signals are transmitted from a user terminals in predetermined channels (the PUCCH or the PUSCH) and in predetermined formats (PUCCH format 1 or PUCCH format 3). Note that, although a case will be presented with the following description where retransmission acknowledgement signals are transmitted in response to downlink data signals that are received via the downlink shared channel (PDSCHs) of two CCs (P-cell and S-cell), the number of CCs is by no means limited to this.

Figure 13:
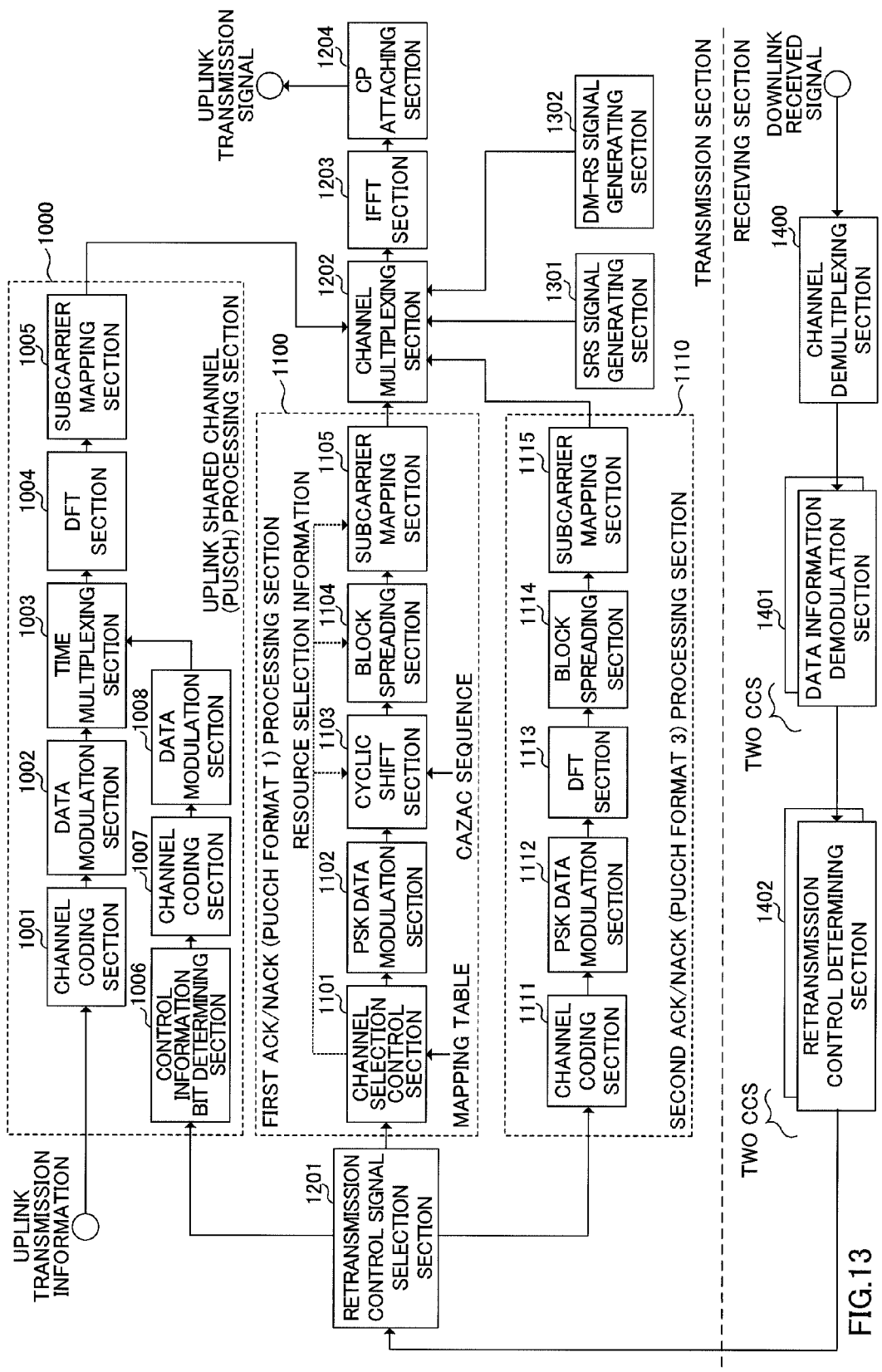
FIG. 13 is a diagram to explain an overall configuration of a user terminal.

The user terminal shown in FIG. 13 has a transmission section and a receiving section. The receiving section has a channel demultiplexing section 1400 that demultiplexes received signals into control information and data signals, a data information demodulation section 1401 that demodulates OFDM signals, and a retransmission control determining section 1402 that checks the necessity of retransmissions of downlink data signals per P-cell and S-cell. Meanwhile, the transmission section has a retransmission control signal selection section 1201, an uplink shared channel (PUSCH) processing section 1000, a first ACK/NACK processing section 1100, a second ACK/NACK processing section 1110, an SRS signal generating section 1301, a DM-RS signal generating section 1302, a channel multiplexing section 1202, an IFFT section 1203, and a CP attaching section 1204. The feedback of retransmission control signals (retransmission control information) is controlled primarily by using the retransmission control signal selection section 1201, the uplink shared channel (PUSCH) processing section 1000, the first ACK/NACK processing section 1100 and the second ACK/NACK processing section 1110.

The data information demodulation section 1401 receives and demodulates downlink OFDM signals. That is, the data information demodulation section 1401 removes the CPs from the downlink OFDM signals, applies a fast Fourier transform, extracts the subcarriers where the BCH signal or downlink control signals are allocated, and demodulates the data. If downlink OFDM signals are received from a plurality of CCs, the data is demodulated per CC. The data information demodulation section 1401 outputs the downlink signals after data demodulation to the retransmission control determining section 1402.

The retransmission control determining section 1402 determines whether or not the downlink data signals (PDSCH signals) have been received without errors, and checks the necessity of retransmissions based on each state—namely, an ACK if the downlink shared channel signal has been received without errors, a NACK if errors are detected, and a DTX if no downlink data signal is detected—and outputs the determined results. If a plurality of CCs are allocated for communication with the radio base station, whether or not the downlink data signal has been received without errors is determined on a per CC basis. The retransmission control determining section 1402 outputs the determined results to a transmission section (here, the retransmission control signal selection section 1201).

The retransmission control signal selection section 1201 selects the physical uplink channel and PUCCH formats to apply to the feedback of retransmission control signals. To be more specific, whether retransmission control signals are included and transmitted in an uplink shared channel (PUSCH) or transmitted in an uplink control channel (PUCCH) is determined depending on whether or not there are uplink data signals to transmit. Also, when retransmission control signals are transmitted in the uplink control channel, the PUCCH formats to apply to the retransmission control signals are selected.

For example, when transmitting uplink signals (user data) via the PUSCH, the retransmission control signal selection section 1201 outputs the determined results output from the retransmission control determining section 1402 to the uplink shared channel processing section 1000. Meanwhile, when not transmitting uplink signals (user data) in the subframe in which the retransmission control signal are fed back, the retransmission control signal selection section 1201 outputs the determined results to the first ACK/NACK processing section 1100 for PUCCH format 1 and/or the second ACK/NACK processing section 1100 for PUCCH format 3, and generates each retransmission control signal in a predetermined PUCCH format.

When retransmission control signals are fed back using PUCCH resources, the retransmission control signal selection section 1201 selects the PUCCH formats to apply to the retransmission control signals of P-cell and S-cell based on the ratio between UL and DL subframes between P-cell and S-cell. For example, when the ratio of DL subframes is higher in S-cell than in P-cell, as shown earlier with reference to FIGS. 10 and 11, among the PUCCH resources allocated to the retransmission control signals of P-cell and the PUCCH resources allocated to the retransmission control signals of S-cell, PUCCH format 3 is applied to parts where the PUCCH resource indices overlap, and PUCCH format 1 is applied to parts where the PUCCH resource indices do not overlap.

To be more specific, the retransmission control signal selection section 1201 is able to apply PUCCH format 1 to retransmission control signals for S-cell downlink data signals that are demodulated by using downlink control information in which the CCE index number fulfils either condition 1 or condition 2 above.

The uplink shared channel processing section 1000 has a control information bit determining section 1006 that determines the bits of the retransmission control signals based on the determined results from the retransmission control determining section 1402, a channel coding section 1007 that carries out error correction coding of ACK/NACK bit sequences, a channel coding section 1001 that carries out error correction coding of the data sequences to be transmitted, data modulation sections 1002 and 1008 that perform data modulation of the data signals after coding, a time multiplexing section 1003 that time-multiplexes the modulated data signals and the retransmission acknowledgement signals, a DFT section 1004 that applies an DFT (Discrete Fourier Transform) to the time-multiplex signal, and a subcarrier mapping section 1005 that maps the signal after the DFT to subcarriers.

The first ACK/NACK processing section 1100 for PUCCH format 1 has a channel selection control section 1101 that controls the PUCCH resources to use to transmit retransmission control signals, a PSK data modulation section 1102 that carries out PSK data modulation, a cyclic shift section 1103 that applies cyclic shifts to the data modulated in the PSK data modulation section 1102, a block spreading section 1104 that carries out block spreading of the signals after the cyclic shifts with a block spreading code, and a subcarrier mapping section 1105 that maps the signals after block spreading to subcarriers.

The channel selection control section 1101 determines the PUCCH resources to use to transmit retransmission control signals from the PUCCH of P-cell. Candidates of the PUCCH resources to use in channel selection-based PUCCH format 1b can be selected using above equation 1. Resource selection information is reported to the PSK data modulation section 1102, the cyclic shift section 1103, the block spreading section 1104 and the subcarrier mapping section 1105.

The PSK data modulation section 1102 carries out phase modulation (PSK data modulation) based on the information reported from the channel selection control section 1101. For example, in the PSK data modulation section 1102, data is modulation into bit information of two bits by means of QPSK data modulation.

The cyclic shift section 1103 performs orthogonal-multiplexing using CAZAC (Constant Amplitude Zero Auto Correlation) code sequence cyclic shifts. To be more specific, the time domain signals are each shifted through a predetermined amount of shift. Note that varying cyclic shift amounts, associated with cyclic shift numbers, are provided on a per user basis. The cyclic shift section 1103 outputs the signals after the cyclic shifts to the block spreading section 1104. The block spreading section (orthogonal code multiplication means) 1104 multiplies the reference signals after the cyclic shifts by an orthogonal code (block spreading). Here, the OCC (block spreading code number) to use for the reference signals may be reported from a higher layer by RRC signaling and so on, or the OCC that is associated with the CS of data symbols in advance may be used. The block spreading section 1104 outputs the signals after block spreading to the mapping section 1105.

The subcarrier mapping section 1105 maps the signals after block spreading to subcarriers based on the information reported from the channel selection control section 1101. Also, the subcarrier mapping section 1105 outputs the mapped signals to the channel multiplexing section 1202.

The second ACK/NACK processing section 1110 for PUCCH format 3 has a channel coding section 1111 that carries out error correction coding of ACK/NACK bit sequences and so on, a PSK data modulation section 1112 that carries out PSK data modulation, a DFT section 1113 that applies a DFT (Discrete Fourier Transform) to the data modulated in the PSK data modulation section 1112, a block spreading section 1114 that carries out block spreading of the signals after the DFT, and a subcarrier mapping section 1115 that maps the signals after block spreading to subcarriers.

The DFT section 1113 converts the signals after data modulation to frequency domain signals through a DFT, and outputs the signals after the DFT to the block spreading section 1114. The block spreading section 1114 multiplies the signals after the DFT by an orthogonal code (OCC (block spreading code number)). Here, the OCC may be reported from a higher layer by RRC signaling and so on, or the OCC that is associated with the CS of the data symbols in advance may be used.

The subcarrier mapping section 1115 maps the signals after block spreading to subcarriers. Also, the subcarrier mapping section 1115 outputs the mapped signals to the channel multiplexing section 416.

The SRS signal generating section 1301 generates an SRS (Sounding RS) signal and outputs the signal to the channel multiplexing section 1202. Also, the DM-RS signal generating section 1302 generates a DM-RS signal and outputs the signal to the channel multiplexing section 1202.

The channel multiplexing section 1202 time-multiplexes the signals from the uplink shared channel processing section 1000, the first ACK/NACK processing section 1100 and the second ACK/NACK processing section 1110, and the reference signals from the SRS signal generating section 1301 and the DM-RS signal generating section 1302, and generates transmission signals that include uplink control channel signals.

The IFFT section 417 performs an IFFT of the channel-multiplexed signals and converts these into a time domain signal. The IFFT section 417 outputs the signal after the IFFT to the CP inserting section 418. The CP attaching section 1204 attaches CPs to the signal after orthogonal code multiplication. Then, using an uplink channel of PCC, uplink transmission signals are transmitted to the radio communication apparatus.

Next, the functional configuration of the radio base station that performs radio communication with the user terminal shown in above FIG. 13 will be described with reference to FIG. 14.

Figure 14:
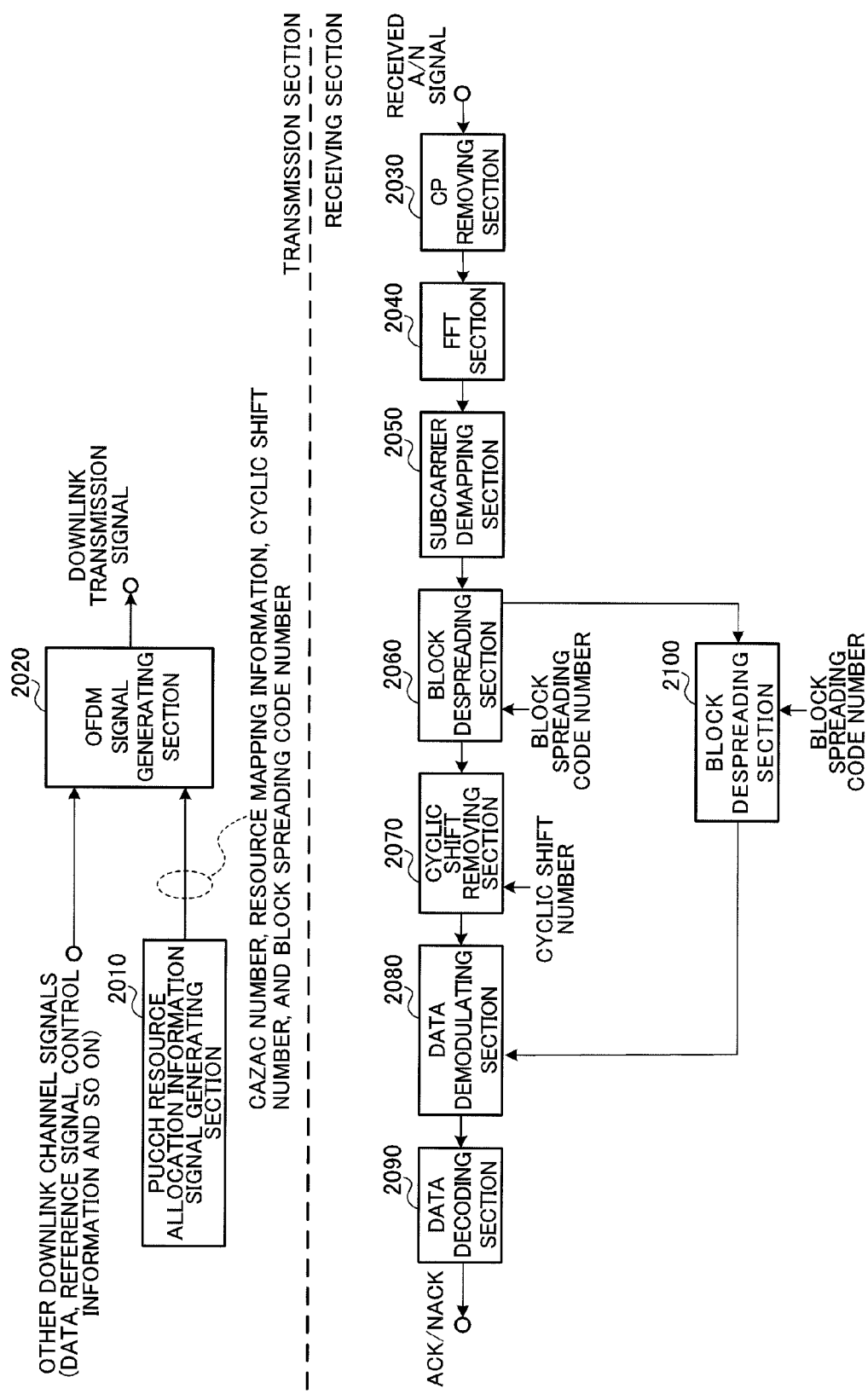
FIG. 14 is a diagram to explain an overall configuration of a radio base station.

The radio base station shown in FIG. 14 has a transmission section and a receiving section. The transmission section has an uplink resource (PUCCH resource) allocation information signal generating section 2010, and an OFDM signal generating section 2020 that multiplexes other downlink channel signals and an uplink resource allocation information signal and generates an OFDM signal. These other downlink channel signals include data, reference signals, control signals and so on.

The uplink resource allocation information signal generating section 2010 generates an uplink resource allocation information signal that contains the CAZAC number, resource mapping information (RB index), the cyclic shift number, the block spreading code number (OCC number) and so on. For example, the uplink resource allocation information signal generating section 2010 determines a plurality of candidate PUCCH resources to report by way of higher layer signaling (for example, RRC) when PUCCH format 3 is applied, the PUCCH resource to report by an ARI and so on.

The OFDM signal generating section 2020 maps a downlink channel signal to include other downlink data signals and uplink resource allocation information signal to subcarriers, performs an inverse fast Fourier transform (IFFT) and attaches CPs, thereby generating a downlink transmission signal. The downlink transmission signal generated in this way is transmitted to the user terminal 100 on the downlink.

The receiving section has a CP removing section 2030 that removes the CPs from a received signal, an FFT section 2040 that performs a fast Fourier transform (FFT) of the received signal, a subcarrier demapping section 2050 that demaps the signal after the FFT, block despreading sections 2060 and 2100 that despread the signal after subcarrier demapping by means of a block spreading code (OCC), a cyclic shift removing section 2070 that removes the cyclic shift from the signal after subcarrier demapping and separates the target user's signal, a data demodulating section 2080 that performs data demodulation of the signal after user separation and the signal after despreading, and a data decoding section 2090 that decodes the signal after data demodulation.

Note that the functional blocks of the receiving section include unillustrated processing blocks for receiving user data (PUSCH), so that user data (PUSCH) is demodulated and decoded in a data demodulation section and a data decoding section, which are not shown.

The CP removing section 2030 remove the parts that are equivalent to the CPs, and extracts the effective signal part. The CP removing section 2030 outputs the signal, from which the CPs have been removed, to the FFT section 2040. The FFT section 2040 converts the received signal into frequency domain signals by performing an FFT. The FFT section 2040 outputs the signals after the FFT to the subcarrier demapping section 2050. The subcarrier demapping section 2050 extracts the retransmission control signals, which are uplink control channel signals, from the frequency domain signals by using resource mapping information. The subcarrier demapping section 2050 outputs the extracted retransmission control signals to the block despreading sections 2060 and 2100.

In the block despreading section 2060, the received signal that has been subjected to block spreading—that is, the received signal that has been orthogonal-multiplexed using an orthogonal code (OCC)—is despread using the orthogonal code that was used in the user terminal. The despread signal is then output to the cyclic shift removing section 2070.

The cyclic shift removing section 2070 demultiplexes the control signals that have been orthogonal-multiplexed using cyclic shifts, by using cyclic shift numbers. Uplink control signal from user terminals 100 have been applied cyclic shifts through varying amounts of cyclic shifts, on a per user basis. Consequently, by applying a cyclic shift, in the opposite direction, through the same amount as the amount of the cyclic shift that was applied in a user terminal 100, it is possible to demultiplex the control signal for the user targeted in the receiving process. Note that the block despreading section 2060 and the cyclic shift removing section 2070 process retransmission control signals generated in PUCCH format 1.

In the block despreading section 2100, the received signal that has been subjected to block spreading—that is, the received signal that has been orthogonal-multiplexed using an orthogonal code (OCC)—is despread using the orthogonal code that was used in the user terminal. Note that the block despreading section 2100 processes retransmission control signals generated in PUCCH format 3.

The data demodulating section 2080 performs data demodulation of the signals from which the cyclic shift has been removed or the signals which have been subjected to block-despreading, and, after this, outputs the resulting signals to the data decoding section 2090. The data decoding section 2090 decodes the signals output from the data demodulating section 2080 and acquires each cell's retransmission control information (ACK/NACK and so on). Using the retransmission control information that is acquired, the radio base station transmits new data (in response to an ACK) or retransmits the data (in response to a NACK).

As has been described above, even when the ratio of downlink subframes is higher in S-cell than in P-cell, among retransmission control signals of S-cell, a user terminal applies PUCCH format 3 to those S-cell retransmission control signals that overlap with PUCCH resources allocated to P-cell retransmission control signals, and applies PUCCH format 1 to those retransmission control signals that do not overlap with PUCCH resources allocated to P-cell retransmission control signals. By this means, it is possible to effectively prevent the PUCCH resources of each retransmission control signal from colliding with each other, and, furthermore, improve the efficiency of use of radio resources and reduce the number of bits required to feed back the retransmission control signals. Note that the radio base station (here, the uplink resource allocation information signal generating section 2010) selects a plurality of candidate radio resources to use when the user terminal adopts PUCCH format 3, and reports these through higher layer signaling. Also, the radio base station includes an ARI that identifies a specific PUCCH resource in downlink control information, and reports this to the user terminal.

Without departing from the scope of the present invention, it is possible to adequately change the number of processing sections and the steps of processing in the above description, and implement the present invention. Also, elements illustrated in the drawings each have functions, and each functional block may be implemented by hardware or may be implemented by software. In addition, it is possible to combine each configuration described in the embodiment as appropriate, and implement the embodiment.

The disclosure of Japanese Patent Application No. 2012-178535, filed on Aug. 10, 2012, including the specification, drawings and abstract, is incorporated herein by reference in its entirety.

The invention claimed is:

1. A radio communication method for a radio base station and a user terminal that adopt carrier aggregation between a first cell and a second cell and that communicate by way of time division duplexing, the radio communication method comprising the steps in which the user terminal:
   receives downlink control information for the first cell and the second cell respectively, allocated to a downlink control channel of the first cell, by adopting cross-carrier scheduling;
   determines retransmission control for downlink data signals transmitted through each cell;
   generates retransmission control signals for each downlink data signal in predetermined uplink control channel formats; and
   allocates the generated retransmission control signals to a resource of an uplink control channel of the first cell and sends feedback to the radio base station,
   wherein, when a ratio of downlink subframes is higher in the second cell than in the first cell, uplink control channel format 3 is applied to a retransmission control signal for a downlink data signal of the second cell demodulated by using downlink control information in which an index number of a channel control element is equal to or lower than a predetermined value, and uplink control channel format 1b is applied to a retransmission control signal for a downlink data signal of the second cell demodulated by using downlink control information in which an index number of a channel control element is greater than the predetermined value.

2. The radio communication method according to claim 1, wherein the user terminal applies uplink control channel format 1b to a retransmission control signal for a downlink data signal of the second cell demodulated by using downlink control information in which an index number of a channel control element meets one of following condition 1 and condition 2:

$n_{cce} > N_X$      Condition 1:

$n_{cce} > N_1$ and $m_s > Y$      Condition 2:

where:
$N_X = \max\{0, \lfloor [N_{RB}^{DL} \times (N_{SC}^{RB} \times X - 4)]/36 \rfloor\}$;
$X = \lceil 4M_{PCell}/M_{SCell} \rceil$;
$Y = 4M_{PCell} - (X-1)M_{SCell} - 1$;
$M_{PCell}$: the number of DL subframes in P-cell;
$M_{SCell}$: the number of DL subframes in S-cell; and
$m_s$: a subframe number of a subframe of second-cell of which to feed back a retransmission control signal.

3. The radio communication method according to claim 1, wherein, when applying uplink control channel format 1b to the retransmission control signal, the user terminal selects an uplink control channel resource, to which the retransmission control signal is allocated, using following equation 1:

$$n_{PUCCH,m}^{(1)} = (M - m - 1) \times N_c + m \times N_{c+1} + n_{CCE,m} + \quad \text{(Equation 1)}$$
$$N_{PUCCH}^{(1)}, m = 0 \sim M - 1$$
$$= (N_{c+1} - N_c)m + (M-1)N_c + n_{CCE,m} + N_{PUCCH}^{(1)}$$
$$N_c = \max\{0, \lfloor [N_{RB}^{DL} \times (N_{SC}^{RB} \times c - 4)]/36 \rfloor\}$$

where:
c: a value selected from {0, 1, 2, 3} so that $c:N_c \leq n_{CCE,m} \leq N_{c+1}$ is met;
$N_{RB}^{DL}$: the number of resource blocks on a downlink;
$N_{SC}^{RB}$: the number of subcarriers per resource block along a frequency direction;
M: the number of subframes of which to feed back retransmission control signals;
m: a subframe number of a subframe of which to feed back a retransmission control signal;
$n_{CCE,m}$: the first CCE index number constituting downlink control information; and
$N^{(1)}_{PUCCH}$: a parameter reported by higher layer signaling.

4. The radio communication method according to claim 1, wherein, when applying uplink control channel format 3 to the retransmission control signal, the user terminal allocates the retransmission control signal to a predetermined uplink control channel resource that is designated by an ARI included in the downlink control information, from among a plurality of resources that are reported by higher layer signaling.

5. The radio communication method according to claim 1, wherein uplink control channel format 1b is applied to a retransmission control signal for a downlink data signal of the first cell.

6. A radio communication system comprising a radio base station and a user terminal that adopt carrier aggregation between a first cell and a second cell and that communicate by way of time division duplexing, wherein the user terminal comprises a processor, the processor having:
   a receiving section that receives downlink control information for the first cell and the second cell respectively, allocated to a downlink control channel of the first cell, by adopting cross-carrier scheduling;
   a determining section that determines retransmission control for downlink data signals transmitted through each cell; and
   a feedback control section that generates retransmission control signals for each downlink data signal in predetermined uplink control channel formats, allocates the generated retransmission control signals to a resource of an uplink control channel of the first cell and sends feedback to the radio base station, wherein, when a ratio of downlink subframes is higher in the second cell than in the first cell, the feedback control section applies uplink control channel format 3 to a retransmission control signal for a downlink data signal of the second cell demodulated by using downlink control information in which an index number of a channel control element is equal to or lower than a predetermined value, and applies uplink control channel format 1b to a retransmission control signal for a downlink data signal of the second cell demodulated by using downlink control information in which an index number of a channel control element is greater than the predetermined value.

7. A user terminal that adopts carrier aggregation between a first cell and a second cell and that communicates with a radio base station by way of time division duplexing, the user terminal comprising a processor, the processor having:
- a receiving section that receives downlink control information for the first cell and the second cell respectively, allocated to a downlink control channel of the first cell, by adopting cross-carrier scheduling;
- a determining section that determines retransmission control for downlink data signals transmitted through each cell; and
- a feedback control section that generates retransmission control signals for each downlink data signal in predetermined uplink control channel formats, allocates the generated retransmission control signals to a resource of an uplink control channel of the first cell and sends feedback to the radio base station,
wherein, when a ratio of downlink subframes is higher in the second cell than in the first cell, the feedback control section applies uplink control channel format 3 to a retransmission control signal for a downlink data signal of the second cell demodulated by using downlink control information in which an index number of a channel control element is equal to or lower than a predetermined value, and applies uplink control channel format 1b to a retransmission control signal for a downlink data signal of the second cell demodulated by using downlink control information in which an index number of a channel control element is greater than the predetermined value.

8. The radio communication method according to claim 2, wherein, when applying uplink control channel format 1b to the retransmission control signal, the user terminal selects an uplink control channel resource, to which the retransmission control signal is allocated, using following equation 1:

$$n^{(1)}_{PUCCH,m} = (M - m - 1) \times N_c + m \times N_{c+1} + n_{CCE,m} + \quad \text{(Equation 1)}$$
$$N^{(1)}_{PUCCH}, m = 0 \sim M - 1$$
$$= (N_{c+1} - N_c)m + (M - 1)N_c + n_{CCE,m} + N^{(1)}_{PUCCH}$$
$$N_c = \max\{0, \lfloor [N^{DL}_{RB} \times (N^{RB}_{SC} \times c - 4)]/36 \rfloor\}$$

where:
- c: a value selected from {0, 1, 2, 3} so that $c:N_c \leq n_{CCE,m} \leq N_{c+1}$ is met;
- $N_{RB}^{DL}$: the number of resource blocks on a downlink;
- $N_{SC}^{RB}$: the number of subcarriers per resource block along a frequency direction;
- M: the number of subframes of which to feed back retransmission control signals;
- m: a subframe number of a subframe of which to feed back a retransmission control signal;
- $n_{CCE,m}$: the first CCE index number constituting downlink control information; and
- $N^{(1)}_{PUCCH}$: a parameter reported by higher layer signaling.

9. The radio communication method according to claim 2, wherein, when applying uplink control channel format 3 to the retransmission control signal, the user terminal allocates the retransmission control signal to a predetermined uplink control channel resource that is designated by an ARI included in the downlink control information, from among a plurality of resources that are reported by higher layer signaling.

10. The radio communication method according to claim 2, wherein uplink control channel format 1b is applied to a retransmission control signal for a downlink data signal of the first cell.

* * * * *